(12) United States Patent
Kurtts

(10) Patent No.: US 6,729,592 B1
(45) Date of Patent: May 4, 2004

(54) HIGHLY ADJUSTABLE SUPPORT FOR OPTICAL DEVICES

(76) Inventor: Russell Kurtts, P.O. Box 380993, Birmingham, AL (US) 35238

( * ) Notice: Subject to any disclaimer, the term of this patent is extended or adjusted under 35 U.S.C. 154(b) by 96 days.

(21) Appl. No.: 10/132,391

(22) Filed: Apr. 24, 2002

Related U.S. Application Data

(60) Provisional application No. 60/286,128, filed on Apr. 24, 2001.

(51) Int. Cl.⁷ ................................................ E04G 3/00
(52) U.S. Cl. ............................. 248/278.1; 248/282.1; 248/183.1
(58) Field of Search .......................... 248/278.1, 282.1, 248/231.71, 284.1, 292.14, 324, 323, 280.11, 183.1, 183.2, 187.1; 403/113, 112, 116, 53, 54, 84, 87; 396/428, 419, 426, 427; 352/243

(56) References Cited

U.S. PATENT DOCUMENTS

| | | | | |
|---|---|---|---|---|
| 399,345 A | * | 3/1889 | Poehlman | |
| 790,217 A | * | 5/1905 | Mason | 108/1 |
| 3,601,598 A | * | 8/1971 | Horn | 362/418 |
| 4,546,708 A | * | 10/1985 | Wilburth | 362/418 |
| 4,562,987 A | * | 1/1986 | Leeds et al. | 248/278.1 |
| 4,590,695 A | * | 5/1986 | McGillivray | 248/278.1 |
| 4,836,486 A | * | 6/1989 | Vossoughi | 248/281.1 |
| 5,037,053 A | * | 8/1991 | Fox | 248/278.1 |
| 5,347,740 A | | 9/1994 | Rather et al. | 42/94 |
| 5,649,257 A | | 7/1997 | Kempka | 396/428 |
| 5,664,750 A | | 9/1997 | Cohen | 248/231.71 |
| 5,876,005 A | | 3/1999 | Vasconi | 248/276.01 |
| 5,992,809 A | * | 11/1999 | Sweere | 248/278.1 |
| 6,113,046 A | * | 9/2000 | Wang | 248/278.1 |
| 6,142,437 A | | 11/2000 | Wilkins, Jr. | 248/231.71 |
| 6,244,759 B1 | | 6/2001 | Russo | 396/428 |
| 6,394,403 B1 | * | 5/2002 | Hung | 248/276.1 |

* cited by examiner

Primary Examiner—Gwendolyn Baxter
(74) Attorney, Agent, or Firm—Bradley, Arant, Rose & White LLP.

(57) ABSTRACT

Disclosed is an improved support for an optical device. The support is preferably made from lightweight materials such as aluminum so that it can be carried by a user to a given area for use. In addition, the support is designed so that it can be folded into a compact state for easy transport to a given area for use. The support is also designed so that it can be attached to objects that were not designed to receive a support for an optical device and still place the mount (which is attached to the optical device) in a position suitable for use.

20 Claims, 4 Drawing Sheets

HIGHLY ADJUSTABLE SUPPORT FOR OPTICAL DEVICES

FIELD OF THE DISCLOSURE

This application claims priority to U.S. patent application Ser. No. 60/286,128, which was filed on Apr. 24, 2001, and which is incorporated herein by reference. The present disclosure relates generally to an improved, adjustable support for an optical device. Specifically, the present disclosure relates to a highly adjustable support for an optical device specifically adapted for use by outdoor enthusiasts.

BACKGROUND

The present disclosure describes a highly adjustable support for an optical device that is adapted for use by outdoor enthusiasts, such as hunters and nature watchers. Although the prior art has described a number of such supports for optical devices for general purpose use, and several mounts adapted for use by outdoor enthusiasts, these supports do not meet the unique needs presented by use in outdoor environments.

Outdoor enthusiasts use optical devices for a variety of purposes in the pursuit of their outdoor activities. For example, many take pictures of animals and scenery they encounter. In addition, hunters often take pictures or video footage of the animals they hunt or observe. In many cases, the outdoor enthusiast has his/her hands occupied with other matters and does not have a hand free to hold and operate an optical device, such as a camera or video recorder. Therefore, in order to use an optical device, a stable support for the optical device is required. For maximum performance, the support should be able attach to a wide range of objects, such as, but not limited to, tree branches, tree stands, fence post and the like, which may be encountered in the natural setting. As these objects may not always be present at the desired angle for optimal use of the optical device, the mount should be adjustable in order to place the optical device in a suitable position for use. In addition, the support should be easily and quickly adjustable to allow the operator to easily locate and follow a target with the optical device during use.

As the devices currently available fail to satisfy all of these requirements, there is a need for an improved support for an optical device that satisfies the shortcomings of the prior devices. The support of the present disclosure provides such a solution.

SUMMARY

The present disclosure describes an improved support for an optical device. The support in its most general form comprises an attachment means, a leveling means adjustably secured to the attachment means, a support arm adjustably secured to the leveling means and a mount for an optical device secured to the support arm. The support is preferably made from lightweight material such as aluminum so that it can be carried by a user to a given area for use. In addition, the support is designed so that it can be folded into a compact state for easy transport to a given area for use. The support is also designed so that it can be attached to objects that were not designed to receive a support for an optical device and still place the mount (with the attached optical device) in a position suitable for use.

In one embodiment, the leveling means comprises a vertical adjustment element adjustably secured to the attachment means at a first pivot point and a horizontal adjustment element adjustably secured to the vertical adjustment element at a second pivot point. The vertical adjustment element can rotate at least 90 degrees, and preferably at least 180 degrees, about the first pivot point, and the horizontal adjustment element can rotate at least 90 degrees about the second pivot point. Through rotation of the vertical adjustment element and the horizontal adjustment element about the first and second pivot points, the leveling means is adjustable so as to place the support arm and the mount (with its attached optical device) in a suitable position for use, regardless of the orientation of the object to which the support is attached. The support arm is adjustably connected to the leveling means and comprises at least 2, and preferably 3, arms adjustably connected to one another. In the embodiment where the support arm comprises three arms, the first arm is rotatably connected to the leveling means, the second arm is rotatably connected to the first arm, and the third arm is rotatably connected to the second arm. A standard mount for an optical device is provided and secured to the third arm. The rotatable connections are accomplished through a coupling means. In one embodiment, the coupling means are frictional disks. Through the use of the coupling means, sufficient resistance is provided to position and maintain the support arm in a desired configuration, yet sufficient freedom of movement is retained so that the support arm may be easily adjusted by the user. Additionally, the coupling means provide strength for the support arm, allowing the support arm to receive optical devices of at least 12 pounds in weight.

Therefore, it is an object of the disclosure to provide an improved, highly adjustable support for an optical device that is adapted for use by outdoor enthusiasts. It is another object of the present disclosure to provide such a support that is lightweight and compact, so that a user can easily transport the support to an intended area of use, which may be an outdoor environment. Furthermore, it is an object of the disclosure to provide a support for an optical device that can be attached to a wide range of objects that were not designed to receive a support for an optical device, and still place the support arm and mount in a position suitable for use. It is another object of the disclosure to provide a support for an optical device that can be easily adjusted by a user with minimal effort and in a silent manner. Yet another object of the invention is to provide a support for optical devices capable of supporting optical devices of at least 12 pounds in weight without undesirable deflection.

The foregoing objects of the invention are provided for illustration only. Other objects may become apparent to those after reading the specification and attached claims. A preferred embodiment of the support for optical devices is described in the detailed description below, with reference to the accompanying figures.

DETAILED DESCRIPTION

Figure 1A:
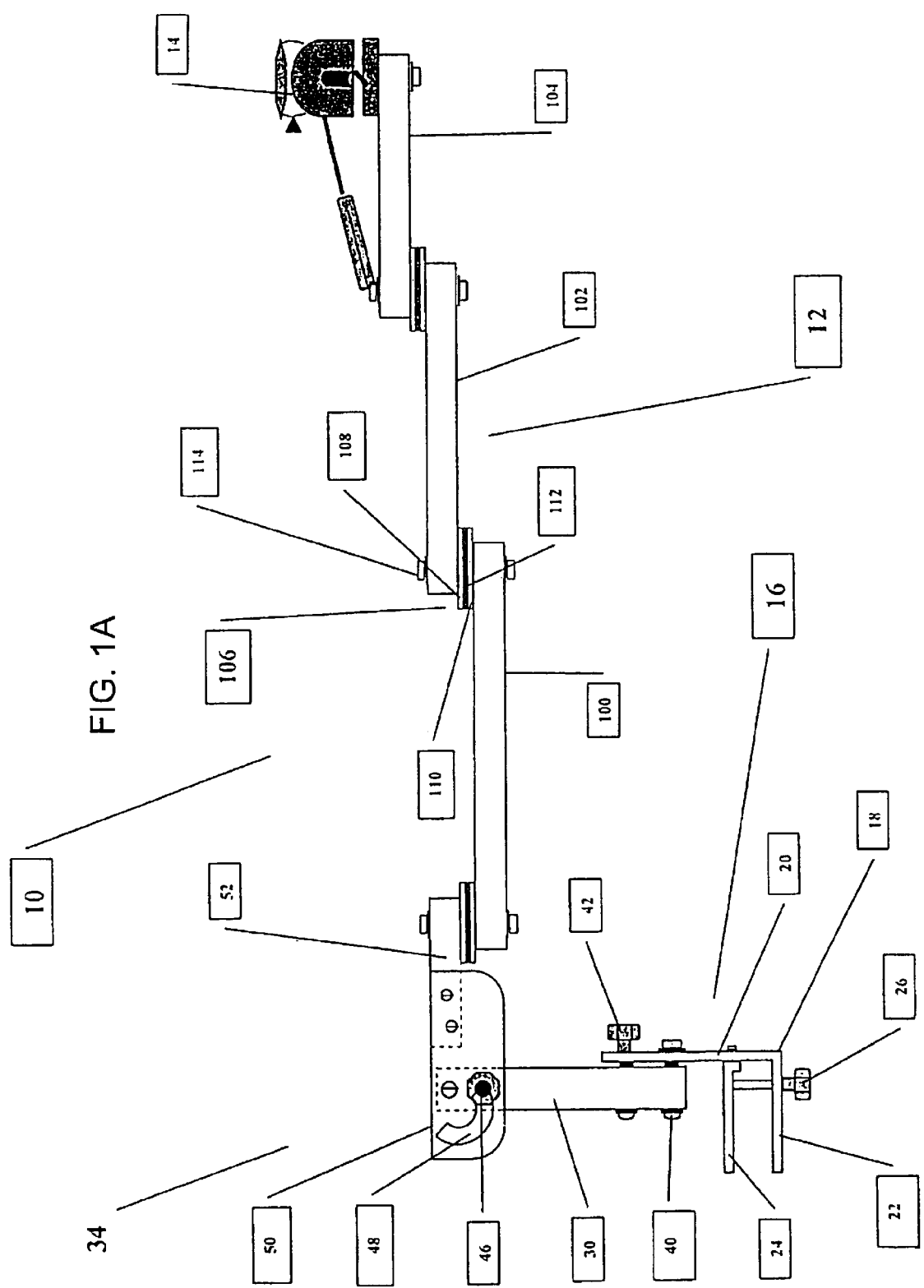
FIG. 1A is a side view of one embodiment of the support of the present disclosure.

Referring now to the figures, where like reference numbers indicate like structures, one embodiment of the support of the present disclosure will be described in detail so that its principles of operation may be better understood. FIG. 1A is a side view of one embodiment of the support 10. The support 10 comprises an attachment means for removably attaching the support 10 to an object, a leveling means adjustably secured to the attachment means, an adjustable support arm 12 adjustably secured to the leveling means and a mount 14 for an optical device secured to the support arm 12.

Figure 1B:
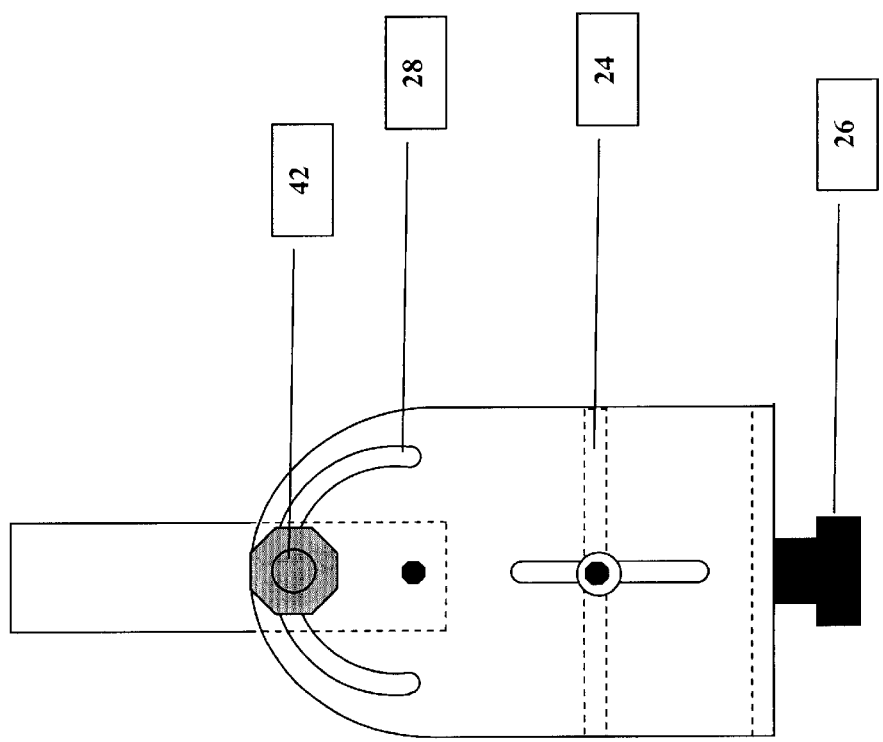
FIG. 1B is a front view of one embodiment of the attachment means.
Figure 2:
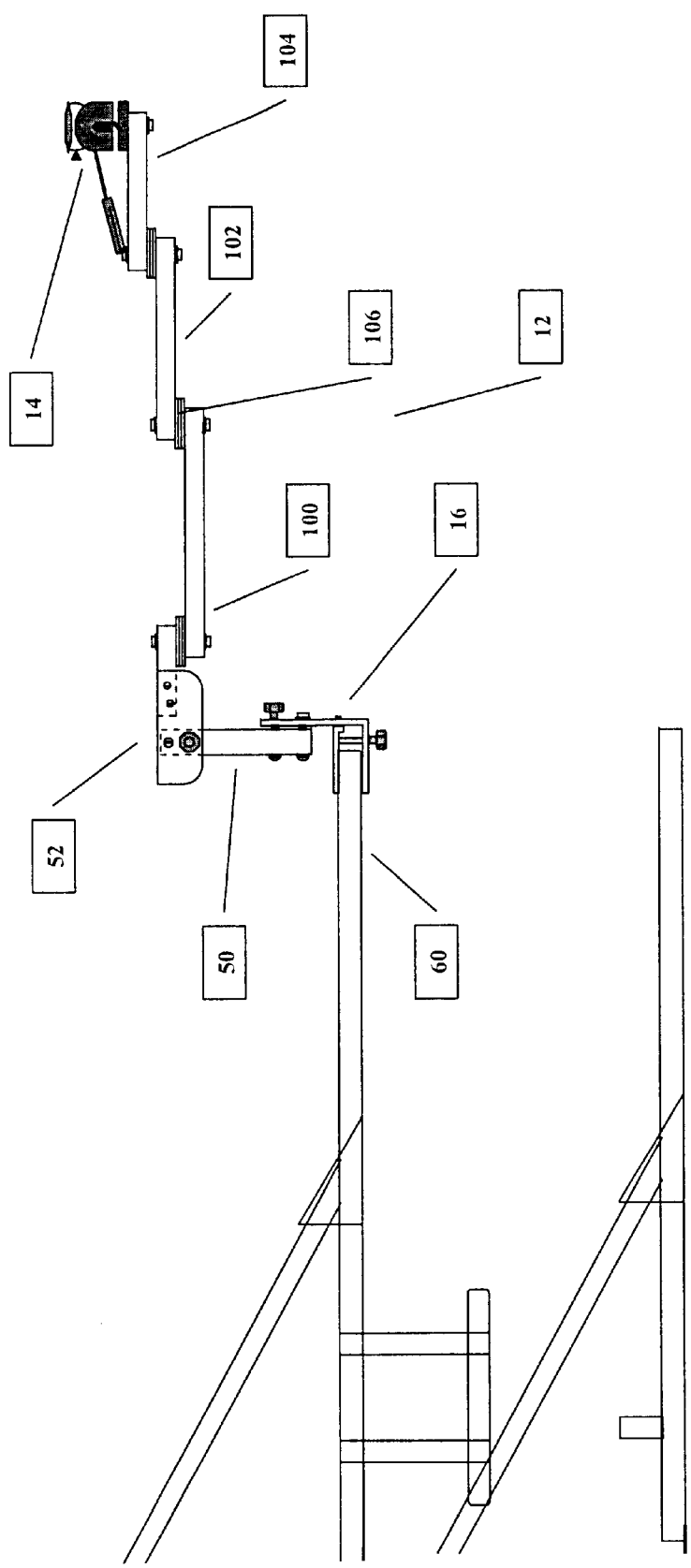
FIG. 2 is a side view of one embodiment of the support of the present disclosure mounted to a tree stand.

The attachment means is designed so that it can be removably attached to objects that were not designed to receive a support for an optical device. The attachment means is illustrated in FIGS. 1 and 2 as a clamp 16. The clamp 16 comprises an L-shaped base 18 with an upper 20 and a lower 22 portion, and an adjustable plate 24 secured to the lower portion 22 by a securing means, illustrated in FIGS. 1 and 2 as a self-securing clamping knob 26. By rotating the clamping knob 26, the adjustable plate 24 can be adjusted either up or down relative to lower portion 22 to secure the support 10 to an object. By virtue of the adjustable nature of clamp 16, the support 10 may be removably secured to a variety of objects regardless of the configuration of the objects. As illustrated in FIG. 1B, the L-shaped base further comprises an arched groove 28 in upper portion 20 to adjustably secure the leveling means. The function of groove 28 in allowing adjustment of the leveling means is discussed in detail below.

The leveling means allows the support 10 to be adjusted so that the support arm 12 positions the mount 14 so that the optical device is in a position to view and/or capture images of a target. Optical devices are defined for the purposes of the specification and claims as a device containing at least one optical lens and which can be used to view and/or capture images of a target, including, but not limited to binoculars, spotting scopes, telescopes, cameras and video cameras. In the embodiment illustrated in FIGS. 1 and 2, the leveling means comprises a vertical adjustment element 30 adjustably secured to the attachment means at a first pivot point and a horizontal adjustment element 34 adjustably secured to the vertical adjustment element 30 at a second pivot point. In the embodiment illustrated, the vertical adjustment element is secured to the attachment means by a fastening means, illustrated as bolt 40 with self-securing nut, and securing means, illustrated as self-securing clamping knob 42. The vertical adjustment element 30 has freedom of rotation about bolt 40 and first pivot point is defined by a line passing parallel to the long axis of bolt 40. The clamping knob 42 is received by groove 28 on the upper portion 20 of clamp 16 to allow adjustment of the support 10 in the vertical plane. By loosening the clamping knob 42, the vertical adjustment element can be adjusted in the vertical plane by moving in groove 28; when a desired position is reached in the vertical plane, the clamping knob 42 can be tightened to secure the vertical adjustment element 30 in place. The range of motion of the vertical adjustment element is dependent on the configuration of groove 28, and in the embodiment illustrated in FIG. 1B, groove 28 is an arc of approximately 180 degrees. The configuration of groove 28 can be varied, but the support 10 functions optimally when groove 28 is configured so that the vertical adjustment element 30 can rotate at least approximately 180 degrees about the first pivot point.

The leveling means allows the support 10 to be adjusted so that the support arm 12 positions the mount 14 so that the optical device is in a position to view and/or capture images of a target. Optical devices are defined for the purposes of the specification and claims as a device containing at least one optical lens and which can be used to view and/or capture images of a target, including, but not limited to binoculars, spotting scopes, telescopes, cameras and video cameras. In the embodiment illustrated in FIGS. 1 and 2, the leveling means comprises a vertical adjustment element 30 adjustably secured to the attachment means at a first pivot point and a horizontal adjustment element 34 adjustably secured to the vertical adjustment element 30 at a second pivot point. In the embodiment illustrated, the vertical adjustment element is secured to the attachment means by a fastening means, illustrated as bolt 40 with self-securing nut, and securing means, illustrated as self-securing clamping knob 42. The vertical adjustment element 30 has freedom of rotation about bolt 40 and first pivot point is defined by a line passing parallel to the long axis of bolt 40. The clamping knob 42 is received by groove 28 on the upper portion 20 of clamp 16 to allow adjustment of the support 10 in the vertical plane. By loosening the clamping knob 42, the vertical adjustment element can be adjusted in the vertical plane by moving in groove 28; when a desired position is reached in the vertical plane, the clamping knob 42 can be tightened to secure the vertical adjustment element 30 in place. The range of motion of the vertical adjustment element is dependent on the configuration of groove 28, and in the embodiment illustrated in FIG. 1B, groove 28 is an arc of approximately 180 degrees. The configuration of groove 28 can be varied, but the support 10 functions optimally when groove 28 is configured so that the vertical adjustment element 30 can rotate at least approximately 180degrees about the first pivot point.

In the embodiment illustrated, the horizontal adjustment element 34 further comprises a mounting plate 50 and a support arm extension 52. Mounting plate 50 contains groove 49 and is secured to the vertical adjustment element 30 by a fastening means, illustrated as bolt 44 and self-securing nut, and securing means, illustrated as self-securing clamping knob 46. The horizontal adjustment element has freedom of rotation about bolt 44 and the second pivot point is defined by a line passing parallel to the long axis of bolt 44. The clamping knob 46 is received by groove 48, allowing the horizontal adjustment element 34 to rotate about the second pivot point. The support arm extension 52 is configured so that the horizontal adjustment element 34 can rotate about the second pivot point without contacting the vertical adjustment element 30. By loosening the clamping knob 46, the horizontal adjustment element 34 can be adjusted in the horizontal plane by moving in groove 48; when a desired position is reached in the horizontal plane, the clamping knob 46 can be tightened to secure the horizontal adjustment element 34 in position. The range of motion of the horizontal adjustment element is dependent on the configuration of groove 48, and in the embodiment illustrated, groove 48 is an arc of approximately 90 degrees. The configuration of groove 48 can be varied, but the support 10 functions optimally when groove 48 is configured so that the horizontal adjustment element 34 can rotate at least approximately 90 degrees about the second pivot point.

Through rotation of the vertical adjustment element 30 and the horizontal adjustment element 34 about the first and second pivot points, the leveling means allows the support 10 to be adjusted so that the support arm 12 positions the mount 14 so that the optical device is in a position to view and/or capture images of a target. In use, the user clamps the support 10 to an object. Once secured to the object, the user adjust the vertical adjustment element 30 until the support arm 12 is in the desired vertical position with respect to the support 10, and then adjust the horizontal adjustment element 34 until the support arm 12 is in the desired horizontal position with respect to the support 10. The adjustability of the leveling means allows the optical device to be placed in a suitable position regardless of the orientation of the object to which the support 10 is attached. This feature is especially attractive to outdoor enthusiasts and sportsmen that may have to attach the support 10 to makeshift objects in a natural setting that would not be suitable for use with supports for optical devices that are currently available.

Figure 3B:
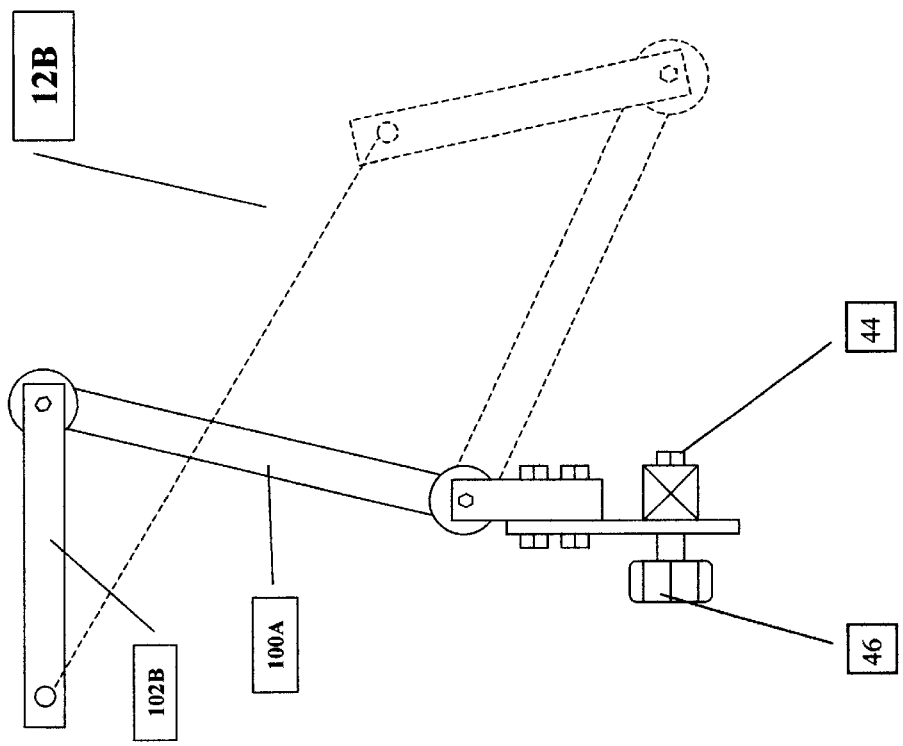
FIGS. 3A and 3B show a top view of two embodiments of the support of the present disclosure, illustrating movement of the support arm.
Figure 3A:
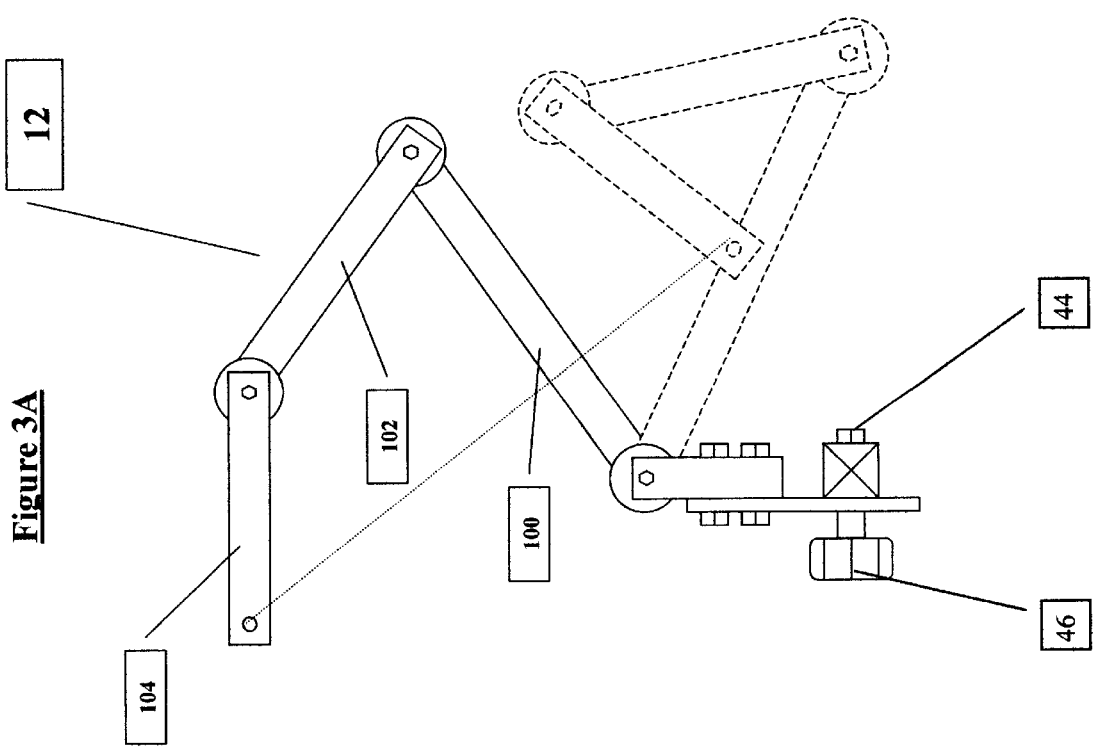

Although one embodiment of the attachment means and the leveling means have been described above in detail, any similar means that will allow the support 10 to be removably attached to an object and adjusted as described should be considered within the scope of the present disclosure The support arm 12 is attached to the leveling means. In the embodiment illustrated in FIGS. 1–3, the support arm 12 is attached to the support arm extension 52. The support arm 12 comprises at least 2, and preferably 3, arms adjustably connected to one another and to the support arm extension 52. FIGS. 1A, 2, and 3A illustrate the support arm 12 comprising a first arm 100, a second arm 102 and a third arm 104. The first arm 100 is rotatably connected to the support arm extension 52 of the leveling means, the second arm 102 is rotatably connected to the first arm 100 opposite the rotatable connection to the leveling means, and the third armn 104 is rotatably connected to the second arm 102 opposite the rotatable connection to the first arm. A standard mount 14 for an optical device is provided and secured to the third arm 104. The rotatable connections are accomplished through a coupling means. Through the use of the coupling means, sufficient resistance is provided to position and maintain the support arm 12 in a desired configuration, yet sufficient freedom of movement is retained so that the support arm 12 may be easily adjusted by the user.

Although the support 10 is functional with only 2 arms comprising the support arm 12, the use of three arms offers advantages during use of the support 10, especially during adjustment of the support arm 12. With the use of the three arms, 100, 102 and 104 as described above, the mount 14 can be placed in a desired position with less overall movement of the support arm 12, as compared to a support arm 12 comprising only 2 arms. This concept is illustrated in FIGS. 3A and 3B. FIG. 3A shows the support arm 12 comprising a first arm 100, a second arm 102 and a third arm 104, with the mount 14 (not shown for clarity) secured to the third arm 104, while FIG. 3B shows a support arm 12B comprising a first arm 100A and a second arm 102B, with the mount 14 (not shown for clarity) attached to the second arm 102B. In FIGS. 3A and 3B, both an original position of the support arm 12 and 12B are shown (illustrated in phantom) and an end position of the support arm 12 and 12B are illustrated. To move the third arm 104 from the original position (in phantom) to the end position requires less movement of second arm 102 (FIG. 3A), than to move second arm 102B from the original position (in phantom) to the end position (FIG. 3B). Since less movement is required, the support arm 12A can placed in a position to view and/or capture images of a target with a smoother and more efficient overall motion as compared to support arm 12B.

In the embodiment illustrated in FIGS. 1–3, the coupling means are illustrated as frictional disks 106. The frictional disks 106 comprise an upper disk plate 108, a lower disk plate 110 and a reduced frictional material 112 moveably secured between the upper 108 and lower 110 disk plates. In one embodiment, 1 piece of reduced frictional material 112 is secured between the upper 108 and lower 110 disk plates.

In this embodiment, the upper 108 and lower 110 disk plates rotate against the reduced frictional material 112. In a preferred embodiment, 2 pieces of reduced frictional material 112 are moveably secured between the upper 108 and lower 110 disk plates. In this embodiment, one piece of reduced frictional material 112 rotates against the other piece of reduced frictional material 112, allowing smoother rotation of the upper 108 and lower 110 disk plates with respect to one another. The reduced frictional material 112 can be any material that allows the upper 108 and lower 110 disk plates to rotate freely with respect to one another. The reduced frictional material 112 is selected from the group consisting of UHMW (ultra high molecular weight), Teflon and nylon, with Teflon being preferred. The thickness of the reduced frictional material can be varied, but the applicant has used material ⅛ of an inch thick with good results.

An added benefit of using the frictional disks 106 with reduced frictional material 112 is the support arm 12 can be adjusted with no noise being generated during the adjustment process. Many prior art supports used utilize joints, hinge points and cranks that can create squeaks and other unnatural sounds when the supports are adjusted. As the support 10 is envisioned to be used in outdoor situations to capture images of targets such as wild animals, any noise generated during use of the support 10 can be an extreme disadvantage.

The upper 108 and lower 110 disk plates, as well as the reduced frictional material 112, each have an opening therein to receive a fastening means, illustrated as bolt 114 and self-securing nut. The securing means extends through the components of the frictional disks 106 via the openings therein, and also passes through the support arms and/or the support arm extension 52 to create the rotatable connection. For instance, in the rotatable connection of the first arm 100 to the support arm extension 52, the frictional disk 106 is placed between the first arm 100 and the support arm extension 52. First arm 100 and support arm extension 52 have openings aligned with the openings in the components of the frictional disk 106 to receive bolt 114. Bolt 114 is passed through these openings and secured with the self-securing nut.

In addition to providing freedom of movement to the support arm 12, the coupling means provide added strength for the support arm. The size of the frictional disks can be varied depending on the weight of the optical device to be supported. In one embodiment, the frictional disks 106 are 2.0 inches in diameter and manufactured from ⅛ inch thick aluminum bar. The support arm 12 equipped with frictional disks 106 as described above can receive optical devices of at least 12 pounds in weight without significant deflection when the support arm is in the fully extended configuration (such as when attached to a standard tree stand 60, illustrated in FIG. 2). The support 10 can be designed with frictional disks that are either larger or smaller than described above.

The support for optical devices described herein is useful in a variety of situations. Without limiting the use of the support of the present disclosure, the support is especially useful in outdoor environments where the circumstances of use may render currently available systems to support an optical device impractical. For example, a game hunter may wish to use the support of the present disclosure to capture video images of a game animal he is hunting or studying. The hunter carries the support to a given area and attaches the support to an available object. In many cases, the hunter will utilize a tree stand and secure the support to a section of the tree stand. In other situations, the hunter may utilize a blind or other structure on the ground and secure the support to the blind or other structure. The attachment means is designed so that the support can be removably and securely attached to a variety of objects in a range of orientations. The hunter then uses the leveling means, described and illustrated herein as the vertical adjustment element and the horizontal adjustment element to place the support arm and mount in a desired position. As described above, the vertical and horizontal adjustment elements can be rotated about their respective pivot points so that the support arm positions the mount and the optical device in a position to view and/or capture images of a target regardless of the orientation of the object to which the support is attached. The hunter then adjusts the support arm to position the video recorder in a desired position to video the target. Once the video camera is in position, the hunter is then free to attend to other activities that require his attention. As discussed above, the coupling elements, described in the preferred embodiment as frictional disks, provide sufficient resistance to place the support arm in a desired position, yet allow sufficient freedom of movement so as to allow the support arm to be quickly, quietly and smoothly adjusted by the hunter with minimal effort using one hand. In this manner the hunter can quickly adjust the support arm if required.

The attached abstract is provided to the Patent and Trademark Office and the public in general to quickly determine essence of the disclosure. The abstract should not be interpreted to define any element of the disclosure, nor should it be read so as to limit the disclosure or the claims in any way.

The description above is intended to be illustrative of the highly adjustable support for optical devices described herein. It should be appreciated that various modifications could be made to the support which remain within the scope and teaching of the instant disclosure. The details given herein regarding the preferred embodiment are to be interpreted as illustrative only, and not in a limiting sense.

What is claimed:

1. An adjustable support for an optical device, the support comprising:
   a. an attachment means for removably attaching the support to an object;
   b. a leveling means adjustably secured to the attachment means, the leveling means comprising a vertical adjustment element adjustably secured to the attachment means at first pivot point so that the vertical adjustment element can be adjusted at least 90 degrees about the first pivot point, and a horizontal adjustment element adjustably secured to the vertical adjustment element at a second pivot point so the horizontal adjustment element can be adjusted at least 90 degrees about the second pivot point;
   c. an adjustable support arm adjustably secured to the leveling means; and
   d. a standard mount for the optical device secured to the end of the support.

2. The support of claim 1 where the leveling means is adjustable to allow the support arm to position the mount in a position to view and/or capture images of a target regardless of an orientation of the object.

3. The support of claim 1 where the support arm comprises a first arm rotatably connected to the leveling means and a second arm rotatably connected to the first arm by a coupling means.

4. The support of claim 3 where the coupling means is a frictional disk.

5. The support of claim 4 where the frictional disk provides sufficient resistance to position and maintains the support arm in a desired configuration, but provides sufficient freedom of movement so that the support arm can be adjusted by an operator.

6. The support of claim 5 where the frictional disk comprises an upper disk plate, a lower disk plate and a piece of reduced frictional material moveably secured between the upper disk plate and the lower disk plate so that the upper disk plate and the lower disk plate can rotate freely with respect to each other.

7. The support of claim 6 where the reduced friction material is selected from the group consisting of ultra high molecular weight, nylon and Teflon.

8. The support of claim 5 where the frictional disk comprises an upper disk plate, a lower disk plate, a first piece of reduced frictional material and a second piece of reduced frictional material, the first and second pieces of reduced frictional material moveably secured between the upper disk plate and the lower disk plate so that the upper disk plate and the lower disk plate can rotate freely with respect to each other.

9. The support of claim 8 where the reduced friction material is selected from the group consisting of ultra high molecular weight, nylon and Teflon.

10. The support of claim 9 where the mount for the optical device is secured to the second arm opposite the rotatable connection to the first arm.

11. The support of claim 3 where the support arm further comprises a third arm rotatably connected to the second arm by a coupling means.

12. The support of claim 4 where the coupling means is a frictional disk.

13. The support of claim 12 where the frictional disk provides sufficient resistance to position and maintains the support arm in a desired configuration, but provides sufficient freedom of movement so that the support arm can be adjusted by an operator.

14. The support of claim 13 where the frictional disk comprises an upper disk plate, a lowerdisk plate and a piece of reduced frictional material moveably secured between the upper disk plate and the lower disk plate so that the upper disk plate and the lower disk plate can rotate freely with respect to each other.

15. The support of claim 14 where the reduced friction material is selected from the group consisting of ultra high molecular weight, nylon and Teflon.

16. The support of claim 13 where the frictional disk comprises an upper disk plate, a lower disk plate, a first piece of reduced frictional material and a second piece of reduced frictional material, the first and second pieces of reduced frictional material moveably secured between the upper disk plate and the lower disk plate so that the upper disk plate and the lower disk plate can rotate freely with respect to each other.

17. The support of claim 16 where the reduced friction material is selected from the group consisting of ultra high molecular weight, nylon and Teflon.

18. The support of claim 17 where the mount for the optical device is secured to the third arm opposite the rotatable connection to the second arm.

19. The support of claim 11 where the components of the support are manufactured from aluminum.

20. The support of claim 1 where the attachment means comprises an L-shaped base, the base comprising a lower portion and an upper portion, and a plate adjustably secured to the upper portion.

* * * * *